(12) United States Patent  (10) Patent No.: US 8,854,640 B2
Nakamaki                    (45) Date of Patent:    Oct. 7, 2014

(54) ELECTRONIC DEVICE, CONTROL METHOD FOR AN ELECTRONIC DEVICE, AND RECORDING MEDIUM

(75) Inventor: Motohiro Nakamaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 368 days.

(21) Appl. No.: 13/222,584

(22) Filed: Aug. 31, 2011

(65) Prior Publication Data

US 2012/0062923 A1  Mar. 15, 2012

(30) Foreign Application Priority Data

Sep. 13, 2010 (JP) .................................. 2010-203952

(51) Int. Cl.
*G06F 3/12* (2006.01)
*G06K 15/00* (2006.01)
*H04N 1/60* (2006.01)

(52) U.S. Cl.
CPC ............ *G06F 3/1284* (2013.01); *G06F 3/1248* (2013.01); *G06F 3/1229* (2013.01); *G06F 3/1209* (2013.01)
USPC .......... 358/1.13; 358/1.15; 358/1.16; 358/1.9

(58) Field of Classification Search
USPC ............... 358/1.13, 1.9, 1.16, 1.15, 3.32, 1.1, 358/443, 448, 401; 709/210, 203, 217, 223, 709/225, 226, 220, 249; 719/321, 312, 313, 719/322, 327, 328, 320, 318
See application file for complete search history.

(56) References Cited

U.S. PATENT DOCUMENTS 5,036,476 A  7/1991 Yamaguchi et al.
5,075,874 A  12/1991 Steeves et al.
5,726,769 A  3/1998 Imai et al.
5,930,004 A  7/1999 Imai et al.
6,333,794 B2  12/2001 Imai et al.
2002/0015173 A1 *  2/2002 Miura et al. ................ 358/1.13
2005/0200878 A1 *  9/2005 Nakazato .................... 358/1.13

FOREIGN PATENT DOCUMENTS

| JP | 01-258968 B2 | 10/1989 |
| JP | 06-071978 A | 3/1994 |
| JP | 06-091954 A | 4/1994 |
| JP | 06-183104 A | 7/1994 |
| JP | 08-002067 A | 1/1996 |
| JP | 08-123639 A | 5/1996 |
| JP | 08-137639 A | 5/1996 |

OTHER PUBLICATIONS

Masatoshi, Information Processing System and Printer Used for the Same, May 17, 1996, Machine Translated Japanse Patent Publication, JP08123639, all Pages.*

Gladman, What is a Printer Driver, Feb. 7, 2010, Webpage Publication, http://www.inktechnologies.com/blog/what-is-a-printer-driver, all pages.*

* cited by examiner

Primary Examiner — Ngon Nguyen (57) ABSTRACT

An electronic device that supports multiple command systems embodies a function for switching from one to another of the multiple command systems regardless of the specifications of the command system being used. A hybrid device 10 that operates based on commands sent from a host computer 200 sets a specific transition condition for changing to another command system after the last command system change corresponding to a switching command sent from the host computer 200. When the set transition condition is met, the computer returns to the command system used before the command system was last changed or changes to another command system.

20 Claims, 7 Drawing Sheets

ELECTRONIC DEVICE, CONTROL METHOD FOR AN ELECTRONIC DEVICE, AND RECORDING MEDIUM

BACKGROUND

1. Technical Field

The present invention relates to an electronic device that operates according to commands sent from a computer, a control method for the electronic device, and a recording medium on which instructions for executing the control method are carried.

2. Related Art

Various types of printers and other electronic devices can be connected to a host computer such as a personal computer, and the command language used by the host computer to control such electronic devices typically differs according to the model or type of device. It is also increasingly common for plural host computers to share a single electronic device, such as when plural host computers and plural printers are connected to a network. Normally, the command system of the commands output by each host computer match the requirements of the specific electronic device being addressed. In this type of networked environment, however, a connected electronic device may not be compatible with the command system used by the host computer, and the command system must be changed on the host computer side. Japanese Unexamined Patent Appl. Pub. JP-A-H08-123639 therefore teaches an electronic device that supports a plurality of command systems and can switch between command languages as instructed by the host computer.

The command systems used by the host computer according to the related art may include command systems that do not enable the electronic device being controlled to switch between plural command languages. When the host computer switches to such a command system, the host computer cannot output a command causing the electronic device to change to another command system. Switching to another command system must therefore be done on the electronic device side. This requires operator intervention to manually change the command system by, for example, turning the electronic device off, resetting a particular switch, and then turning the power on again. This switching operation is both bothersome and error-prone. More specifically, when a conventional command system that does not define a function for switching to a different command system is used, switching to another command system cannot be done easily.

SUMMARY

An electronic device according to the invention supports multiple command systems including a conventional command system that does not have a defined function for switching to another command system, and can render a function for switching to another command system regardless of the specifications of the command system used.

A first aspect of the invention is directed to an electronic device configured to communicate with (e.g., by connecting to) a host computer. The electronic device comprises a storage unit that stores at least a first command system and a second command system; a transition condition configuration unit that sets a specific transition condition for changing from the second command system to the first command system; and a command control unit that changes from operating in the second command system to operating in the first command system when the transition condition set by the transition condition configuration unit is satisfied.

When a defined transition condition is satisfied while executing commands in one command system, this aspect of the invention enables changing to executing in another command system. For example, the electronic device can change to another command system (first command system) when the electronic device is using a command system (second command system) that does not have a command defined for switching to a different command system. A function for changing to another command system can therefore be achieved regardless of the specifications of the command system being executed.

In another aspect of the invention, the first command system is compatible with a switching command; and the command control unit changes to the second command system when the switching command is received from the host computer while the command control unit is operating in the first command system.

This aspect of the invention enables changing from a first command system that has a switching command defined for switching to another command system to a second command system, which does not have a command defined for switching to another command system, by a switching command. When the set transition condition is met while operating in the second command system, the command system changes back to the first command system. It is therefore possible to return to the first command system even when the second command system does not have a command for switching to another command system.

In another aspect of the invention, the specific transition condition is contained in the switching command.

This aspect of the invention enables setting a transition condition for changing to the next command system simultaneously to changing the command system of the electronic device by a switching command received from the host computer. It is therefore easy to configure changing to another command system after the electronic device changes to a specific command system and completes a specific operation, for example, without receiving a separate command for setting the transition condition from the host computer.

In another aspect of the invention, the storage unit stores, in addition to the first and second command systems, a third command system; and a condition for changing operation of the command control unit from the third command system to the second command system or vice versa is set in the transition condition configuration unit or is contained in the switching command.

In addition to using a transition condition configuration unit, this aspect of the invention enables changing the command system of the electronic device and simultaneously setting another command system to be changed to by a switching command received from the host computer.

In another aspect of the invention, the first command system is the native command system of the electronic device; and the second command system is a command system that emulates the command system of another electronic device.

This aspect of the invention enables changing from the original command system of the electronic device to a command system for emulating another electronic device, and then returning to the original command system of the electronic device that was previously used when the transition condition is satisfied even if a switching command is not defined in the command system for emulating the other electronic device. It is therefore possible to return to the original command system of the electronic device even after changing the command system to emulate the operation of another electronic device that is not compatible with a switching command. Compatibility with the original command system of the electronic device can therefore be maintained while also being able to emulate another electronic device and return to the native command system of the original electronic device from the emulated command system, and convenience can be assured.

In another aspect of the invention, the first command system is a command system that is compatible with the switching command, and the second command system is a command system that is not compatible with the switching command.

When the electronic device changes from the command system compatible with the switching command to the command system not compatible with the switching command, a transition condition can be set and changing to the other command system triggered by satisfaction of the transition condition is possible even though the command system that is not compatible with the switching command cannot change to another command system. A function for switching to another command system can therefore be maintained regardless of the specifications of the command system being used.

In another aspect of the invention, the electronic device further comprises a first process unit and a second process unit. The first command system is the command system of the first process unit, and the second command system is the command system of the second process unit; and the command control unit determines if a command received from the host computer is a command for the first process unit or a command for the second process unit, and changes to the command system of the first process unit if the received command is determined to be a command for the first process unit.

When the electronic device is a hybrid device that has a first process unit and a second process unit that use different command systems, this aspect of the invention enables changing to the command system of the first process unit when a command received from the host computer is determined to be a command from the command system of the first process unit while operating in the command system of the second process unit, which is not compatible with a switching command for changing to another command system.

In addition, because the command system used can be changed according to whether the first process unit or second process unit is used, the command system appropriate to the process unit can be enabled and used.

In another aspect of the invention, the electronic device further comprises a print unit that prints on a processed medium, and an optical reading unit that optically reads the processed medium. The command system for the first process unit is either a command system for controlling the print unit or a command system for controlling the optical reading unit, and the command system for the second process unit is the other of the command system for controlling the print unit and the command system for controlling the optical reading unit.

When the electronic device is rendered as a hybrid device having a print unit and an optical reading unit that use different command systems, this aspect of the invention can change the command system used according to whether the command received from the host computer is for the print unit or the optical reading unit, and thus enables switching to the command system appropriate to the function used. Because the electronic device can also change to another command system even when the command system used by the print unit or the optical reading unit does not contain a switching command for changing to another command system, convenience can be assured regardless of the command system specifications.

In another aspect of the invention, the transition condition configuration unit sets as a transition condition a condition at least one of: a group including passage of a specific time in the second command system, completing execution of all commands received from the host computer, and completing execution of one command received from the host computer.

This aspect of the invention can reliably maintain a function for switching to another command system irrespective of the specifications of the command system being used because changing to another command system can be reliably triggered by any one of a group of events including at least passage of a specific time after changing the command system, completing execution of all received commands, and completing execution of one received command. Other events that can be similarly used include the receive buffer that stores received commands becoming cleared of all commands to be executed, or execution of a line feed or form feed command when the electronic device has a print unit, for example.

Another aspect of the invention is directed to a control method for an electronic device that is configured to communicate with a host computer and store at least a first command system and a second command system. The method comprises the steps of: setting a specific transition condition for changing from the second command system to the first command system; and changing operation of a control unit of the electronic device from the second command system to the first command system when the transition condition set by the transition condition configuration unit is satisfied.

By executing the control method according to this aspect of the invention, this aspect of the invention enables changing to another command system when a defined transition condition is met while executing commands in one command system. For example, the electronic device can change to another command system (first command system) when the electronic device is using a command system (second command system) that does not have a command defined for switching to a different command system. A function for changing to another command system can therefore be achieved regardless of the specifications of the command system being executed.

Still another aspect of the invention entails a storage medium that stores a program for execution by a control unit to control parts of an electronic device configured to communicate with a host computer and also stores at least a first command system and a second command system. The program comprises instructions for: setting a specific transition condition for changing from the second command system to the first command system; and changing operation of a control unit of the electronic device from the second command system to the first command system when the transition condition set by the transition condition configuration unit is satisfied.

As a result of the control unit executing the program stored on a storage medium according to this aspect of the invention, this aspect of the invention enables changing to another command system when a defined transition condition is met while executing commands in one command system. For example, the electronic device can change to another command system (first command system) when the electronic device is using a command system (second command system) that does not have a command defined for switching to a different command system. A function for changing to another command system can therefore be achieved regardless of the specifications of the command system being executed.

One effect of the invention is that an electronic device according to the invention can change to a different command system even while using a command system that does not have a switching command defined for changing to a different command system, and can therefore maintain a function for changing to a different command system regardless of the specifications of the command system being used.

DESCRIPTION OF EMBODIMENTS

A preferred embodiment of the present invention is described below with reference to the accompanying figures.

Figure 1:
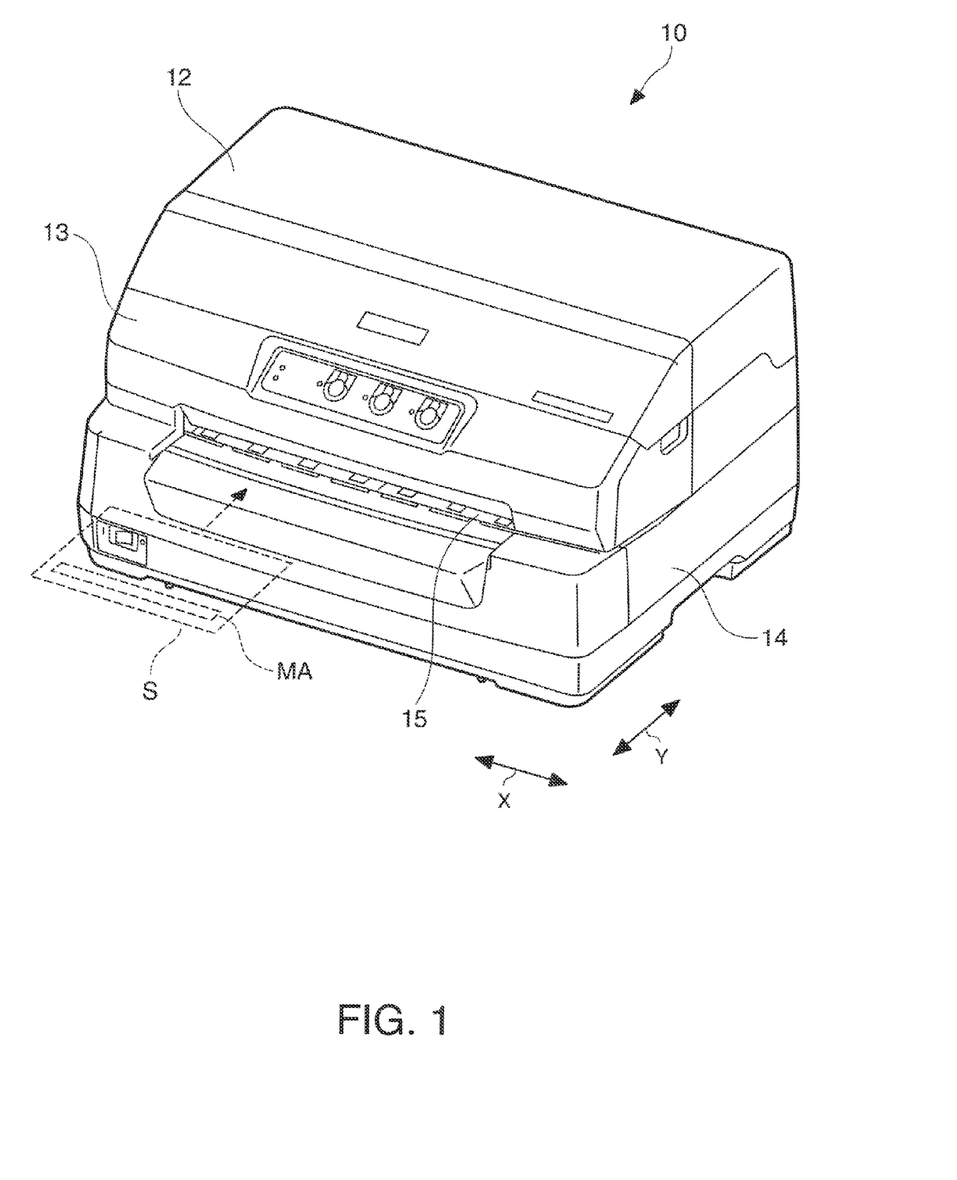
FIG. 1 is an external oblique view of a hybrid device according to a preferred embodiment of the invention.
Figure 2:
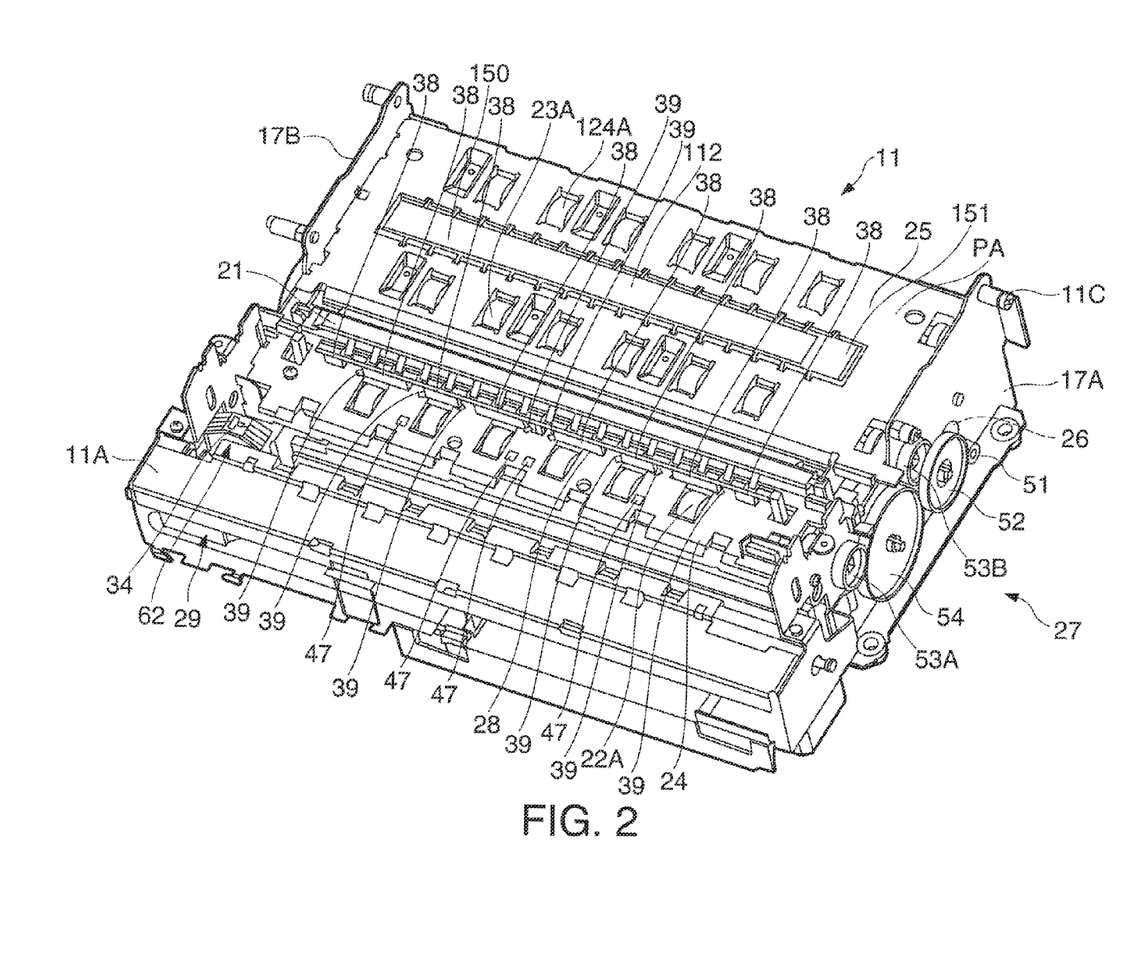
FIG. 2 is an oblique view of the main assembly of the hybrid device.
Figure 3:
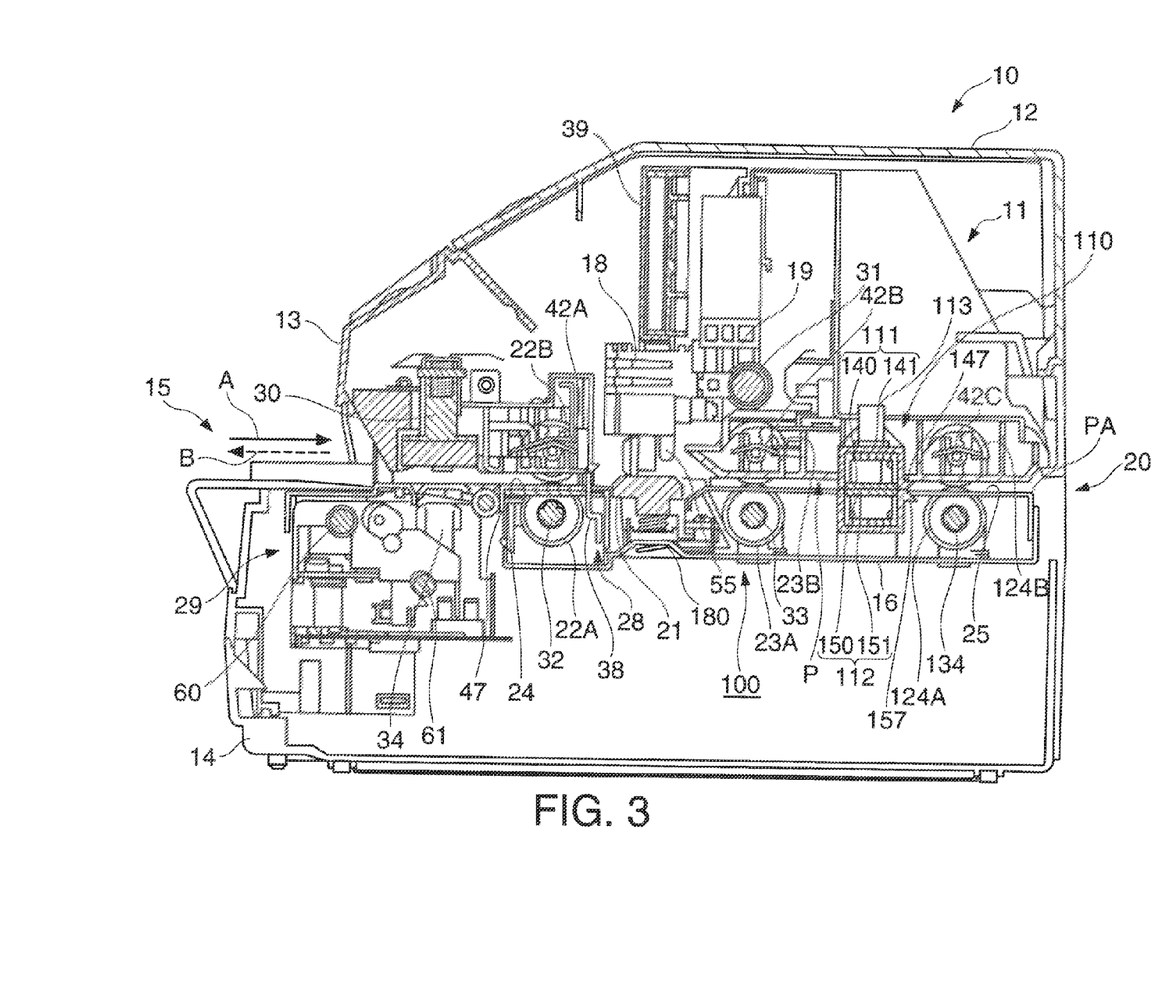
FIG. 3 is a side section view of the main assembly.

FIG. 1 is a front oblique view showing the appearance of a hybrid device according to a preferred embodiment of the invention. FIG. 2 is an external oblique view of the main assembly 11. FIG. 3 is a side section view of the hybrid device 10 in FIG. 1.

The hybrid device 10 shown in FIG. 1 has a printer function for printing on the recording medium S (processed medium) by a serial impact dot matrix (SIDM) recording head 18 ((see FIG. 3); an MICR (magnetic ink character recognition) function or reading characters recorded with magnetic ink on the recording medium S; an MSR (magnetic stripe reader) function for reading and writing information recorded on a magnetic stripe disposed to the recording medium S; and a scanner function for optically scanning both sides of the recording medium S by an optical reader 110 (see FIG. 3).

Cut-sheet media that is precut to a certain length, and continuous media having numerous sheets connected in a continuous web, are examples of recording media S (media) that can be used in the hybrid device 10. Cut-sheet media include, for example, single slips and multipart forms, passbooks, postcards, and letters. Continuous media include continuous multipart form paper and perforated fanfold paper. In this embodiment of the invention checks and promissory notes (collectively referred to herein as simply checks) issued on a bank account, for example, and passbooks issued by a bank or other financial institution, are used as the recording medium S.

Checks are slips on which MICR (magnetic ink character recognition) information containing the user's account number and a serial check number, for example, are printed in a MICR area MA on the front of the check. A passbook is a bound booklet of plural blank pages that can be printed on when the passbook is open. A magnetic stripe is typically renderedon the outside surface of one of the passbook covers.

Note that of the four sides of a rectangular recording medium S, the edge on the side that is inserted to the hybrid device 10 is referred to herein as the leading edge or end, and the edge on the opposite end as the leading end is referred to as the trailing edge or end.

As shown in FIG. 1, the hybrid device 10 has a top cover 12, a top case 13, and a bottom case 14 as outside case members, and a manual insertion opening 15 in the front of the top case 13 and bottom case 14 where the recording medium S is inserted and discharged. A paper exit 20 from which the recording medium S may be discharged is also formed at the back of the top case 13 and bottom case 14. Whether the recording medium S processed by the hybrid device 10 is discharged from the manual insertion opening 15 or the paper exit 20 is controlled by a command sent to the hybrid device 10 from the host computer 200 described below.

The side where the manual insertion opening 15 is rendered, that is, the left side as seen in FIG. 3, is referred to herein as the front, and the side where the paper exit 20 is rendered, that is, the right side in FIG. 3, is referred as the rear or back.

As shown in FIG. 2, the hybrid device 10 has a main assembly 11 that is covered by the foregoing case members. The main assembly 11 includes a bottom chassis part 11A and a top chassis part (not shown in the figure) that is supported by pins 11C at the back of the bottom chassis part 11A. The top chassis part can pivot by operating a lever (not shown in the figure) disposed on the left side of the top chassis part, and the inside of the main assembly 11 is exposed when the top chassis part pivots open.

As shown in FIG. 2 and FIG. 3, the main assembly 11 includes a base frame 16 and a right side frame 17A and left side frame 17B pair attached to the sides of the base frame 16. The side frames (not shown in the figure) of the top case chassis part are disposed on the outside of the side frames 17A and 17B with a carriage guide shaft 31 spanning therebetween and a flat front media guide 24 and rear media guide 25 affixed between the side frames 17A and 17B. A flat platen 21 is disposed between the front media guide 24 and rear media guide 25, and the recording head 18 is disposed above the platen 21 facing the platen 21.

The recording head 18 is mounted on a carriage 19 that is fit freely slidably on the carriage guide shaft 31. The carriage 19 is driven through an intervening timing belt (not shown in the figure) by the forward or reverse rotation of a carriage drive motor 56 (FIG. 4) that drives the carriage 19, and the carriage 19 thus moves reciprocally guided by the carriage guide shaft 31. The carriage 19 scans bidirectionally between the side frames of the top chassis part in the direction indicated by arrow X in FIG. 1, that is, in the main scanning direction aligned with the axial direction of the carriage guide shaft 31 and the long side of the platen 21. Note that the direction perpendicular to the main scanning direction X of the carriage 19, that is, the direction indicated by arrow Y in FIG. 1, is the secondary scanning direction.

While the recording head 18 carried on the carriage 19 travels in the main scanning direction with the carriage 19, recording wires are pushed out from the wire face (not shown in the figure) on the distal end of the recording head 18 opposite the platen 21 to strike the ink ribbon and transfer ink from the ink ribbon to the recording medium S conveyed between the platen 21 and the recording head 18, and record an image, which may include text, on the recording medium S. The ink ribbon is stored folded inside a ribbon cartridge (not shown in the figure) that is mounted on the main frame or the carriage 19, and is delivered to the recording head 18 while the carriage 19 scans the recording medium. As shown in FIG. 3, a media width sensor 55 is disposed behind the recording head 18 at a position above the platen 21. The media width sensor 55 is mounted on the carriage 19 and travels with the carriage 19 over the platen 21, and is used to determine the positions of the side edges of the recording medium S and the width of the recording medium S.

As shown in FIG. 2 and FIG. 3, the platen 21 is flat and extends in the scanning direction of the carriage 19, and is flexibly supported and urged toward the recording head 18 by an urging spring 180. The urging spring 180 is a compression spring, and the striking force of the recording wires during the recording operation of the recording head 18 is assisted by the urging force of the urging spring 180. When the thickness of the recording medium S varies while the recording medium S is conveyed, or when recording media S of different thicknesses are conveyed to the main assembly 11, the platen 21 is pushed by the distal end of the recording head 18 in resistance to the urging force of the urging spring 180 and moves away from the recording head 18. As a result, the gap between the distal end of the recording head 18 and the recording surface of the recording medium S is held constant regardless of the thickness of the recording medium.

As shown in FIG. 3, the printer assembly 11 includes a media conveyance mechanism 100 that conveys the recording medium S, an alignment mechanism 28 that contacts the leading end of the recording medium S conveyed by the media conveyance mechanism 100 and aligns the recording medium S, a magnetic data reading unit 29 having a magnetic head 34 that reads the MICR information printed on a check or reads or writes magnetic information in the magnetic stripe on a passbook, and a media pressure unit 30 that pushes down on the recording medium S to prevent the recording medium S from lifting up during magnetic information processing, including when the magnetic head 34 of the magnetic data reading unit 29 reads the MICR information.

As shown in FIG. 2 and FIG. 3, the media conveyance mechanism 100 includes the platen 21, a first drive roller 22A, a first follower roller 22B, a second drive roller 23A, a second follower roller 23B, a third drive roller 124A, a third follower roller 124B, the front media guide 24, the rear media guide 25, a media conveyance motor 26, and a drive wheel train 27. The media conveyance mechanism 100 renders a conveyance path P through which the recording medium S is conveyed over the front media guide 24 and rear media guide 25. The tops of the front media guide 24 and rear media guide 25 are conveyance surface PA of the conveyance path P.

In this embodiment of the invention the first drive roller 22A and first follower roller 22B are disposed on the front side of the printer assembly 11 relative to the platen 21 and recording head 18, and the second drive roller 23A and second follower roller 23B pair, and third drive roller 124A and third follower roller 124B pair, are disposed sequentially on the rear side of the printer assembly 11 relative to the platen 21 and recording head 18.

The first drive roller 22A and first follower roller 22B are disposed as a roller pair one above the other, the second drive roller 23A and second follower roller 23B are disposed as a roller pair one above the other, and the third drive roller 124A and third follower roller 124B are disposed as a roller pair one above the other.

The first drive roller 22A, second drive roller 23A, and third drive roller 124A are drive rollers that are driven rotationally by the media conveyance motor 26 and drive wheel train 27. The first follower roller 22B, second follower roller 23B, and third follower roller 124B are follower rollers that are urged by springs 42A, 42B, and 42C with specific pressure to the first drive roller 22A, second drive roller 23A, and third drive roller 124A side, respectively. As a result, the first drive roller 22A and first follower roller 22B are rotationally driven in mutually opposite directions, the second drive roller 23A and second follower roller 23B are rotationally driven in mutually opposite directions, and the third drive roller 124A and third follower roller 124B are rotationally driven in mutually opposite directions.

The drive wheel train 27 is disposed on the outside of the right side frame 17A as shown in FIG. 2. The drive wheel train 27 has a motor pinion 51 that is affixed to rotate in unison with the drive shaft of the media conveyance motor 26, which can rotate in forward and reverse directions. Drive power from the motor pinion 51 is transferred through a speed reducing gear 52 to a second drive gear 53B affixed to the second roller shaft 33 of the second drive roller 23A, and is transferred from this second drive gear 53B through an intermediate gear 54 to a first drive gear 53A affixed to the first roller shaft 32 of the first drive roller 22A.

Torque from the second roller shaft 33 of the second drive roller 23A is transferred to the third roller shaft 134 of the third drive roller 124A by a drive belt (not shown in the figure), for example. As a result, the first drive roller 22A, second drive roller 23A, and third drive roller 124A shown in FIG. 3 rotate in the same direction and can convey the recording medium S in the printer assembly 11. More specifically, when the media conveyance motor 26 rotates forward, the first drive roller 22A, second drive roller 23A, and third drive roller 124A shown in FIG. 3 convey the recording medium S in the secondary scanning direction Y inside the printer assembly 11 as denoted by arrow A in the figure, and convey the recording medium S in the direction in which it is discharged from the printer assembly 11 as indicated by arrow B in the figure when the media conveyance motor 26 turns in reverse.

The alignment mechanism 28 aligns the recording medium S before the recording head 18 prints on the recording medium S and before the optical reader 110 scans the recording medium S. The alignment mechanism 28 includes plural alignment plates 38 and an alignment plate motor (see FIG. 4) that drives the alignment plates 38. The alignment plates 38 are arrayed in the main scanning direction between the first drive roller 22A and first follower roller 22B and the recording head 18 and platen 21, and can protrude into the conveyance path P. The alignment mechanism 28 aligns the orientation of the recording medium S by causing the leading end of the recording medium S to contact the alignment plates 38.

As shown in FIG. 2, the printer assembly 11 has a plurality of alignment sensors 39 that detect the presence of the recording medium S driven in contact with the alignment plates 38. The alignment sensors 39 are disposed to the conveyance path P arrayed in the main scanning direction near the upstream side of the alignment plates 38, and are transmissive sensors including a light-emitting unit (such as an LED) and a photodetection unit (such as a phototransistor) disposed with the conveyance path P therebetween. Whether the skew of the recording medium S to the conveyance direction after alignment by the alignment mechanism 28 is within the allowable range can be determined from the number and positions of the plural alignment sensors 39 that detect the leading end of the recording medium S.

The hybrid device 10 has a control circuit board (not shown in the figure) located behind and below the main assembly 11, for example, as a control unit that controls hybrid device 10 operations, including driving the media conveyance motor 26, carriage 19 scanning, the recording operation of the recording wires of the recording head 18, and the reading (scanning) operation of the optical reader 110.

The printer assembly 11 also has a plurality of media edge sensors 47 that detect insertion of a recording medium S to the conveyance path P in front of the first drive roller 22A. The media edge sensors 47 are reflective sensors having a light-emitting unit that emits light toward the conveyance path P and a photodetection unit that detects the reflection of the emitted light, and detect the recording medium S inserted from the manual insertion opening 15. Note that the media edge sensors 47 may alternatively be transmissive sensors having a light-emitting unit and a photodetection unit disposed with the conveyance path P therebetween. This configuration determines that a recording medium S was inserted to the conveyance path P when the photodetection units of all insertion detection sensors 47 sense light and then detection of light by any one of the insertion detection sensors 47 is blocked.

As shown in FIG. 3, the main assembly 11 has an optical reader 110 that reads text, symbols and images presented on the surface of the recording medium S. The optical reader 110 includes a first scanner module 111 that reads information printed or otherwise presented on the top surface of the recording medium S, and a second scanner module 112 disposed opposite the first scanner module 111 that similarly reads information printed or otherwise presented on the bottom surface of the recording medium S. The recording medium S is normally inserted from the manual insertion opening 15 so that the side on which the MICR information is printed is on the bottom.

The first scanner module 111 and second scanner module 112 are optical image sensors that are disposed between the second drive roller 23A and third drive roller 124A and continuously read information from the recording medium S conveyed through the conveyance path P.

The first scanner module 111 and second scanner module 112 may be contact image sensors (CIS), for example, and respectively have a flat glass plate 140, 150 that contacts the recording medium S, and a support frame 141, 151 that supports the glass plate 140, 150. An emitter (not shown in the figure) that illuminates the reading area of the recording medium S with light output from an LED or other light source, a plurality of photosensors (not shown in the figure) arrayed in a single row in the main scanning direction (X axis), and an output unit (not shown in the figure) that outputs the signals from the photosensors to the control circuit unit described above, are housed inside the support frames 141, 151. The first scanner module 111 and second scanner module 112 are not limited to CIS scanners, however, and CCD (charge coupled device) scanners may be used instead.

As shown in FIG. 2, the second scanner module 112 has a support frame 151 and glass plate 150 extending lengthwise across the width of the hybrid device 10 parallel to the platen 21. The support frame 151 is disposed so that the top surface of the glass plate 150 is exposed to the conveyance path P through a window formed in the rear media guide 25. The first scanner module 111 is disposed above the second scanner module 112 as shown in FIG. 3 so that the bottom surface of the glass plate 140 is opposite the top of glass plate 150, and likewise extends in the main scanning direction with substantially the same length as the second scanner module 112.

An urging member 113 is disposed above the first scanner module 111, and the first scanner module 111 is urged toward the recording medium S on the rear media guide 25 by the urging member 113. The urging member 113 pushes the first scanner module 111 to the second scanner module 112 with substantially uniform pressure across the width. A coil spring, flat spring, or elastomer cushion, for example, can be used as the urging member 113. A gap that accommodates recording media of a specific thickness is rendered between the surfaces of the glass plates 140, 150. When scanning a recording medium S, the first scanner module 111 is pushed up by the conveyed recording medium S and the urging member 113 contracts, allowing the recording medium S to pass between the glass plates 140, 150. More specifically, the scanning quality of the optical reader 110 is improved by the first scanner module 111 that is urged by the urging member 113 pushing the recording medium S to the second scanner module 112 side so that the recording medium S reliably contacts the surfaces of the glass plates 140, 150.

The photosensors (not shown in the figure) of the first scanner module 111 and second scanner module 112 are arrayed in a row in the main scanning direction of the hybrid device 10, and scan lines extending in the main scanning direction. The photosensors of the first scanner module 111 and second scanner module 112 are disposed across a wider range in the main scanning direction than the printing range of the recording head 18, and can scan a wider range than any recording medium that can be printed on by the hybrid device 10. The optical reader 110 can therefore read the entire surface of any recording medium S that can be used in the hybrid device 10.

The first scanner module 111 and second scanner module 112 are disposed on opposite sides of the conveyance path P as shown in FIG. 3, but the photosensor line in the first scanner module 111 and the photosensor line in the second scanner module 112 are offset approximately 5 mm from each other in the conveyance direction of the recording medium S. This configuration eliminates the effect of light from one light source on the other photosensor and results in higher scanning quality.

The first scanner module 111 and second scanner module 112 each have R, G, and B light sources, and can scan in both monochrome (binary, 16 level, 256 level gray scale) and color modes. The scanning resolution of the first scanner module 111 and second scanner module 112 can be set to one of three levels, 200 dpi (dots/inch), 300 dpi, and 600 dpi. The number of scan lines in the conveyance direction of the recording medium S (the secondary scanning direction Y) is set according to the scanning resolution in the main scanning direction, and the conveyance speed of the recording medium S during scanning is adjusted according such parameters as the scanning resolution and how fast the photosensor output signals can be processed.

Figure 4:
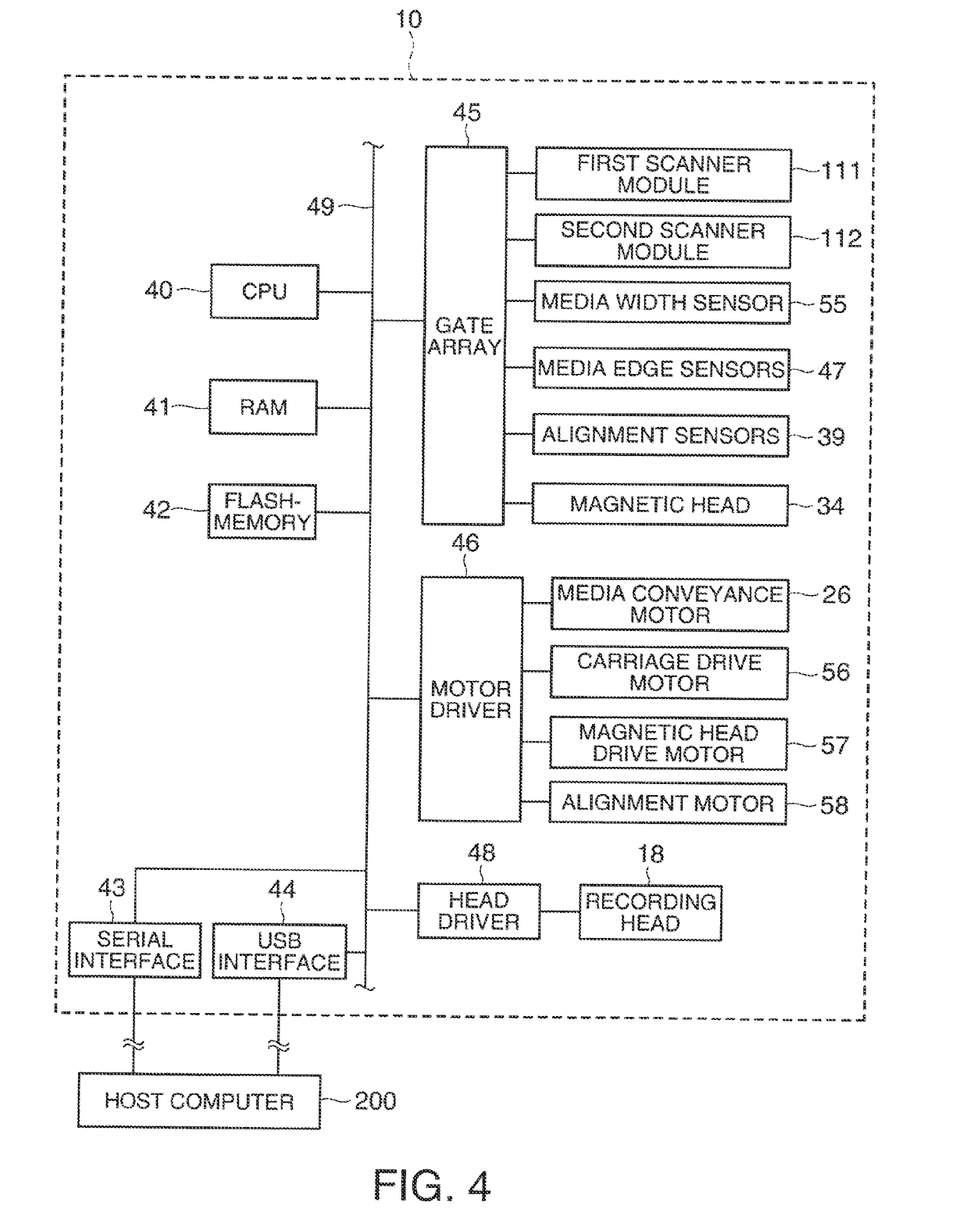
FIG. 4 is a block diagram of the control system of the hybrid device.

FIG. 4 is a block diagram showing the control configuration of the hybrid device 10.

The parts shown in FIG. 4 can be rendered by the cooperation of hardware components disposed to the control circuit board (not shown in the figure) and software.

The hybrid device 10 includes a CPU 40 as a control unit that controls the hybrid device 10 based on a control program, RAM 41 that temporarily stores data, flash-memory 42 that stores the control program executed by the CPU 40 and processed data, a serial interface 43 and USB interface 44 that convert the data format when communicating information with the host computer 200 that controls the hybrid device 10, a gate array 45 connected to various sensors, a motor driver 46 that drives motors, a head driver 48 that drives heads, and a bus 49 to which these various parts are connected.

RAM 41 functions as buffer memory, such as a receive buffer 66 (FIG. 5) the temporarily stores commands sent from the host computer 200, and an image buffer that temporarily stores image data captured by the optical reader 110.

The alignment sensors 39, media edge sensors 47, media width sensor 55, first scanner module 111 and second scanner module 112 are connected to the gate array 45. The gate array 45 quantizes the analog voltages input from the alignment sensors 39, media edge sensors 47, and media width sensor 55, and outputs the resulting digital data to the CPU 40. The first scanner module 111 and second scanner module 112 optically read the surface of the recording medium S using a CIS, supply the detection voltages from each pixel of the CIS to the gate array 45, and the gate array 45 quantizes the analog voltages supplied from the first scanner module 111 and second scanner module 112 and outputs the resulting digital data to the CPU 40.

The magnetic head 34 is also connected to the gate array 45. The gate array 45 outputs a read/write drive current to the magnetic head 34, detects the analog detection voltage of the magnetic head 34 when reading magnetic data, and outputs the voltage as digital data to the CPU 40.

The motor driver 46 is connected to the media conveyance motor 26, carriage drive motor 56, magnetic head drive motor 57, and alignment motor 58, supplies drive current and drive pulses to the motors, and thus causes the motors to operate. Note also that an alignment motor 58 (FIG. 4) for operating the alignment plate 38 (FIG. 3) may also be connected to the motor driver 46.

The head driver 48 is connected to the recording head 18, and supplies drive current to the recording head 18 to drive the recording wires to print.

The CPU 40 acquires detection signals from the sensors and drives the motors to convey the recording medium S by the gate array 45, motor driver 46, and head driver 48 based on a control program stored in flash-memory 42, and drives the heads to record on the recording medium S.

The CPU 40 also conveys the recording medium S by the media conveyance mechanism 100, and reads the surface of the recording medium S by the gate array 45 and first scanner module 111 and second scanner module 112. While scanning, the CPU 40 temporarily stores the data input from the gate array 45 sequentially to a buffer (not shown in the figure) rendered in RAM 41. The CPU 40 also reads and outputs the image data stored in the buffer (not shown in the figure) to the host computer 200 through the serial interface 43 and USB interface 44.

The printing function, MICR function, MSR function, and optical scanner function described above are rendered by the control system of the hybrid device 10 shown in FIG. 4 controlling driving the parts of the main assembly 11 of the hybrid device 10 to operate according to the commands sent from the host computer 200 as a result of the CPU 40 executing a control program stored in flash memory 42.

Figure 5:
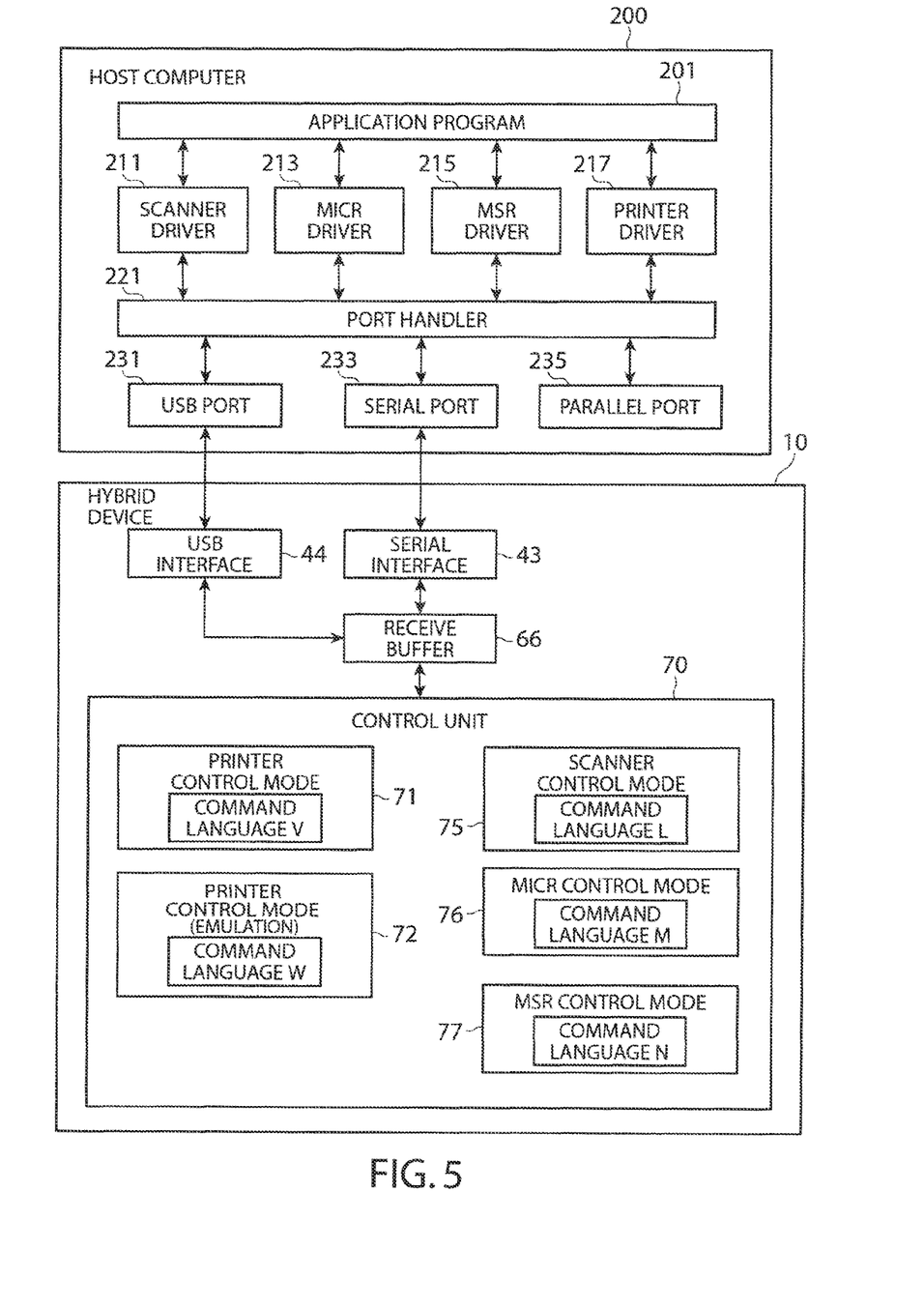
FIG. 5 is a block diagram showing the functional configuration of the host computer and hybrid device.

FIG. 5 is a block diagram showing the functional configuration of the hybrid device 10 and host computer 200.

The host computer 200 renders the functional units shown in FIG. 5 as a result of the CPU (not shown in the figure) executing programs. More specifically, the host computer 200 has an application program 201; various device drivers that render the application program 201 with a scanner driver 211, MICR driver 213, MSR driver 215, and printer driver 217 that provide function modules for controlling the hybrid device 10; and a port handler 221 that assigns the input/output (I/O) ports of the host computer 200 to the different device drivers. The host computer 200 exchanges data and control signals with the hybrid device 10 through the USB port 231, serial port 233, and parallel port 235.

The port handler 221 is achieved as a software construction rendered as a function of the operating system run by the CPU (not shown in the figure) of the host computer 200.

The USB port 231 is rendered by a connector and USB host controller conforming to the USB standard disposed on a hardware circuit board of the host computer 200, and corresponding logical I/O ports of the operating system.

The serial port 233 is rendered by an RS-232C connector and controller conforming to the RS-232C standard disposed on a hardware circuit board, and corresponding logical I/O ports of the operating system.

The parallel port 235 is rendered by a connector and parallel port controller conforming to the IEEE 1284 standard disposed on a hardware circuit board, and corresponding logical I/O ports of the operating system.

The application program 201 is, for example, an application program for processing forms in financial institutions, and includes functions for printing forms, processing checks, and processing passbooks. When these functions are used, the application program 201 outputs requests to the device drivers of the scanner driver 211, MICR driver 213, MSR driver 215, and printer driver 217, and processes data that is input in response to these requests. The hybrid device 10 executes actions including printing on passbooks, printing on checks, reading MICR text from checks, reading magnetic stripes on passbooks, and scanning both sides of checks.

The devices drivers of the scanner driver 211, MICR driver 213, MSR driver 215, and printer driver 217 manage hybrid device 10 operation by generating and outputting commands for executing the requests output from the application program 201 to the port handler 221, and acquiring data sent from the hybrid device 10 in response to the commands.

The hybrid device 10 accordingly has a receive buffer 66 for temporarily storing commands and data sent from the host computer 200 through the serial interface 43 and USB interface 44. The hybrid device 10 can be connected to the host computer 200 through either or both the serial interface 43 and USB interface 44, and stores all commands and data received through the serial interface 43 and USB interface 44 to the receive buffer 66.

The hybrid device 10 also has a control unit 70 that executes commands stored in the receive buffer 66. This control unit 70 is rendered by the CPU 40 (FIG. 4) running a control program.

The control unit 70 can switch the operating mode between a printer control mode 71, printer emulation control mode 72, scanner control mode (emulation) 75, MICR control mode 76, and MSR control mode 77.

The printer control mode 71 and printer emulation control mode 72 are operating modes for printing on checks or passbooks used as the recording medium S in which the gate array 45, motor driver 46, and head driver 48 shown in FIG. 4 drive the media conveyance motor 26, carriage drive motor 56, alignment motor 58, and recording head 18 based on the detected values output by the alignment sensors 39, media edge sensors 47, and media width sensor 55. As a result, the printer control modes 71, 72 convey and align (position) the recording medium S as needed, and print text, symbols, or other markings on the recording medium S.

The scanner control mode 75 is an operating mode for optically reading the recording medium S by the optical reader 110. The scanner control mode 75 controls the gate array 45 and motor driver 46, drives the media conveyance motor 26 and conveys the recording medium S as required based on the output detection signals from the media edge sensors 47 and media width sensor 55, and captures the data output by the first scanner module 111 and second scanner module 112.

The MICR control mode 76 is the operating mode for reading magnetic ink characters recorded on the recording medium S. The MICR control mode 76 controls the gate array 45, motor driver 46, and head driver 48, drives the media conveyance motor 26, magnetic head drive motor 57, and magnetic head 34 based on the output detection signals from the media edge sensors 47 and media width sensor 55, and acquires and interprets the output detection values from the magnetic head 34.

The MSR control mode 77 is an operating mode for reading and writing information recorded in the magnetic stripe of the recording medium S. The MSR control mode 77 controls the gate array 45, motor driver 46, and head driver 48, drives the media conveyance motor 26, magnetic head drive motor 57, and magnetic head 34, and conveys the recording medium S as needed based on the output detection signals from the media edge sensors 47 and media width sensor 55 to acquire the output values from the magnetic head 34 and read the magnetic stripe or write information to the magnetic stripe.

Commands sent from the host computer 200 to the hybrid device 10 are commands defined by a specific command system. The scanner driver 211, MICR driver 213, 315, and printer driver 217 of the host computer 200 are compatible with the specific command systems, and send commands defined by the appropriate command systems to the hybrid device 10. For example, the scanner driver 211 has an API that conforms to the TWAIN specification, and sends scanner control commands to the hybrid device 10.

The operating modes of the control unit 70 of the hybrid device 10 correspond to these different command systems (command groups). For example, the printer control mode 71 is compatible with command system V, and the printer emulation control mode 72 is compatible with command system W. There are plural printer control modes that cause the hybrid device 10 to operate as a printer and print so that the operation of other printers can be emulated. These plural command systems and the commands used in each command system are stored in a storage unit (not shown in the figure) of the control unit 70.

More specifically, the printer emulation control mode 72 is an operating mode for operating according to the commands of the command system (command system W) that is provided for a printer (printer W in this example) other than the hybrid device 10. When a hybrid device 10 replaces a printer W in a system that uses printer W connected to the host computer 200, the printer driver 217 on the host computer 200 must usually be replaced with a printer driver for the hybrid device 10. However, the hybrid device 10 has a printer emulation control mode 72 that emulates the operation of printer W and causes the hybrid device 10 to operate according to the same commands applied to printer W. By implementing the printer emulation control mode 72, the host computer 200 can continue using the printer driver 217 for printer W, thereby avoiding the work involved with installing a new device driver and avoiding problems on the host computer 200 resulting from replacing the device driver.

In addition to the printer control mode 71, which is its native operating mode, the hybrid device 10 according to this embodiment of the invention has a printer emulation control mode 72 for emulating printer W, but numerous printer control modes can obviously be provided in the hybrid device 10 so that a greater number of devices can be emulated. The command system W of this printer control mode 72 is a command emulation system (a second command system, a command system for emulating a another electronic device, a command system for a second process unit), and the command system V of the printer control mode 71 is the command system of the native operating mode (a first command system, the original (native) command system of the electronic device, the command system of a first process unit).

The control mode 75, MICR control mode 76 and MSR control mode 77 are compatible with command systems appropriate to their respective functions. For example, the scanner control mode 75 and MICR control mode 76 are compatible with command systems L and M. The command systems L, M, N of the scanner control mode 75, MICR control mode 76 and MSR control mode 77 may be identical to or inclusive of the command systems used by the scanner driver 211, MICR driver 213, and MSR driver 215 of the host computer 200, and the specific command system can be configured as desired. For example, the hybrid device 10 may be controlled by a proprietary command system, by an industry-standard command system, or by a command system that emulates a different model. These command systems and the commands of the other command systems are stored in a storage unit (not shown in the figures).

The control unit 70 of the hybrid device 10 interprets and executes commands sent from the host computer 200 and stored in the receive buffer 66 in the order received, for example. The control unit 70 always operates in one of the printer control modes 71, 72, scanner control mode 75, MICR control mode 76, or MSR control mode 77, and is always in one of these operating modes. This is because received commands cannot be interpreted and executed if the control unit 70 is not able to operate according to one of these command systems.

The hybrid device 10 according to this embodiment of the invention operates in the printer control mode 71 as its normal (default) operating mode. The command system V of the printer control mode 71 includes a command (switching command) for switching to a different operating mode, and when this command is received, the control unit 70 can switch from the printer control mode 71 to the printer emulation control mode 72, scanner control mode 75, MICR control mode 76, and MSR control mode 77. A command contained in the command systems W, L, M, N of the printer control mode 72, scanner control mode 75, MICR control mode 76 and MSR control mode 77 is also defined in the command system of the printer control mode 71, and when this command is received, control changes to the corresponding operating mode and the commands can be executed. For example, a start scanning command that is required for scanner control is contained in the command system V of the printer control mode 71. As a result, when the start scanning command for the scanner is received after the hybrid device 10 operates as a printer in the printer control mode 71, the printer control mode 71 changes to the scanner control mode 75, and the optical reader 110 starts scanning.

The command system V of the printer control mode 71 is a switching command system that is compatible with a switching command to change to a different command system. The command system W of the printer emulation control mode 72 is a non-switching command system that is not compatible with a switching command for changing to a different command system.

Figure 6:
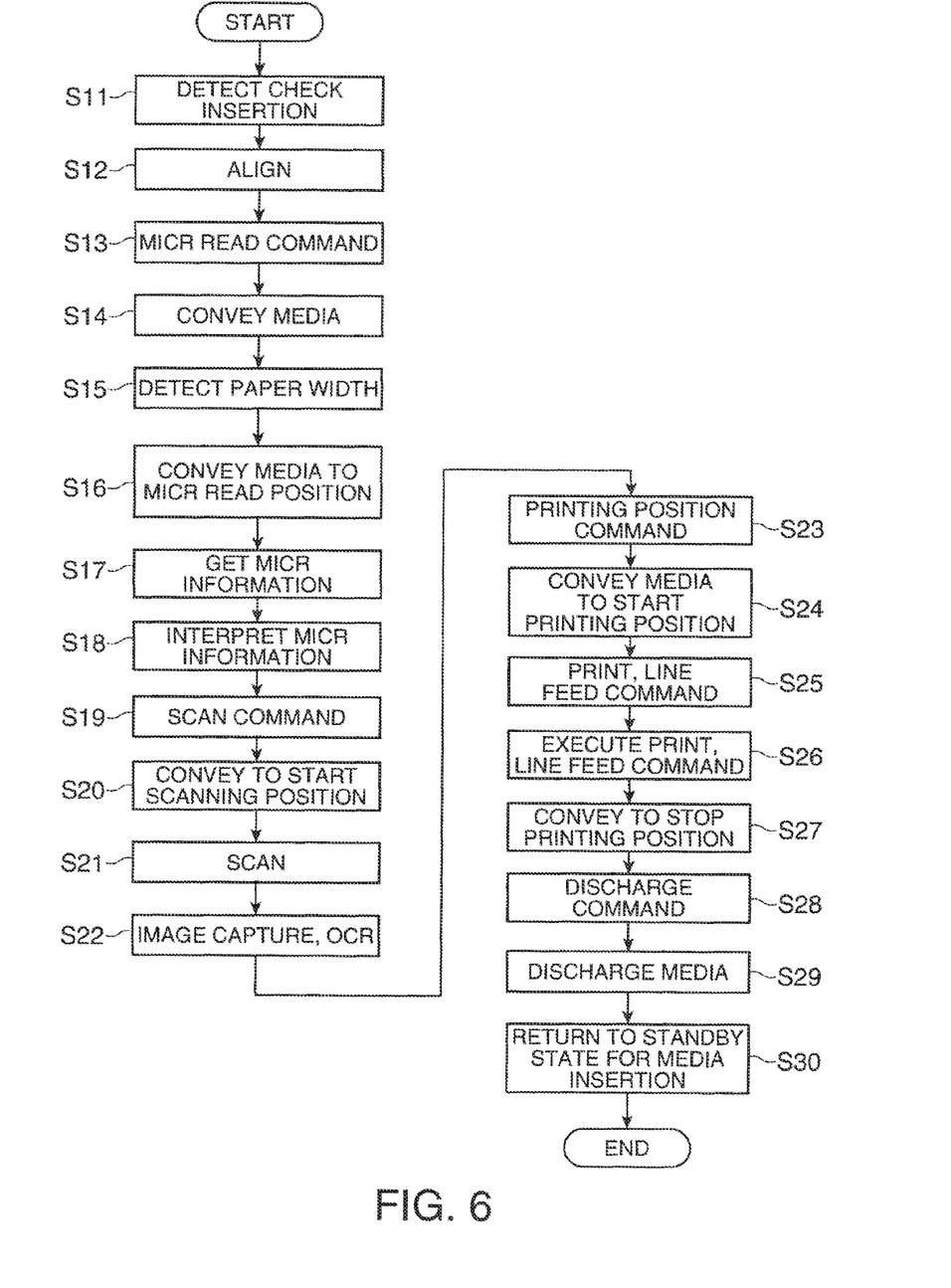
FIG. 6 is a flowchart showing an example of hybrid device operation.

FIG. 6 is a flow chart showing an example of the operation of the hybrid device 10.

The operation described by example in FIG. 6 is the operation performed to read the MICR line of the check, optically scan both sides of the check, print, and then discharge the check when a check has been inserted as the recording medium S from the manual insertion opening 15.

The control unit 70 of the hybrid device 10 starts up in the printer control mode 71, which is set as the default in a storage unit. When the control unit 70 detects based on output from the media edge sensors 47 that a check was inserted to the manual insertion opening 15 (step S11), it executes an alignment operation that controls the motor driver 46 to operate the alignment motor 58 and advance the alignment plate 38 into the conveyance path P while operating the media conveyance motor 26 to align the orientation of the check (step S12). The control unit 70 acquires the output values of the alignment sensors 39 from the gate array 45, and ends the alignment operation by operating the alignment motor 58 and retracting the alignment plate 38 after determining that the check is properly aligned.

If the host computer 200 has asserted an MICR read command (step S13), the control unit 70 receives this command, changes the operating mode to the MICR control mode 76, and executes the command. More specifically, the control unit 70 controls the motor driver 46 to operate the media conveyance motor 26 and convey the check from the alignment position to the width detection position (step S14), and detects the width of the check by driving the carriage drive motor 56 and monitoring output from the media width sensor 55 during this operation (step S15).

The control unit 70 then controls the motor driver 46 to operate the media conveyance motor 26 and convey the check to the MICR reading position (step S16), drives the magnetic head drive motor 57 to scan the check with the magnetic head 34, and acquires the output values from the magnetic head 34 (step S17). The control unit 70 identifies the MICR characters by analyzing the acquired output values of the magnetic head 34 (step S18), and ends the MICR line reading operation.

When a scan command is then sent from the host computer 200 (step S19), the control unit 70 reads this command stored in the receive buffer 66, switches the operating mode to the scanner control mode 75, and executes the command. More specifically, the control unit 70 controls the motor driver 46 and operates the media conveyance motor 26 to convey the check to the scanning start position (step S20). The control unit 70 then operates the media conveyance motor 26, acquires the output data from the first scanner module 111 and second scanner module 112 through the gate array 45, and scans the check (step S21). The control unit 70 then interprets the output data from the first scanner module 111 and second scanner module 112 to capture images of both sides of the check while also performing an OCR (optical character recognition) operation (step S22).

When a command specifying the start printing position is sent from the host computer 200 (step S23), the control unit 70 reads the command stored in the receive buffer 66, switches the operating mode to the printer control mode 71 or printer emulation control mode 72, and executes the command. More specifically, the control unit 70 controls the motor driver 46 to drive the media conveyance motor 26 and convey the check to the start printing position (step S24). When a print command and line feed command are sent from the host computer 200, the control unit 70 executes the commands to drive the media conveyance motor 26 and carriage drive motor 56 and control the head driver 48 to print by the recording head 18 and advance the check after finishing printing each line (step S26). When this printing sequence ends, the control unit 70 drives the media conveyance motor 26 and conveys the check to the stop printing position (step S28).

When a discharge command is sent from the host computer 200 (step S28), the control unit 70 receives and executes the command to drive the media conveyance motor 26 and discharge the check from the manual insertion opening 15 or paper exit 20 (step S29). The control unit 70 then returns to the standby mode to wait for recording medium S insertion (step S30), and this process ends.

As described above, the control unit 70 switches to the operating mode (command system) corresponding to the command sent from the host computer 200, executes the command, and implements the corresponding printer function, scanner function, MICR function, or MSR function.

In this embodiment, the printer emulation control mode 72 uses a command system W for a printer W of a different model. If printer W does not support switching to another command system, it cannot issue a command for switching to another command system to a hybrid device 10 that is operating in the printer emulation control mode 72. The hybrid device 10 can therefore not switch from the printer emulation control mode 72 to another operating mode. In this case, the operator turns the hybrid device 10 off and then restarts to switch to the printer control mode 71, which is the basic operating mode set as the default in a storage unit, or resets the hybrid device 10 by asserting a reset command if a reset command is defined in the command system W of the printer emulation control mode 72, and then restarts from the default printer control mode 71 set in the storage unit.

Because the reset command includes completely deleting all commands and data temporarily stored in the receive buffer 66, the timing when it can be executed is limited. It is therefore difficult to adapt when use of a command system that does not have a command defined for changing to another command system has ended. Expanding the command system W used in the printer emulation control mode 72 to include a command for switching to another command system is also futile if the printer driver 217 of the host computer 200 does not have a corresponding command because switching to another command system will not be possible.

The hybrid device 10 according to this embodiment of the invention therefore also has a function for switching to the printer control mode 71 when specific reset conditions (switching conditions) are satisfied after entering the printer emulation control mode 72. This function sets reset conditions when the printer emulation control mode 72 is entered, and when these reset conditions are satisfied, the operating mode changes to the printer control mode 71 (the native operating mode) or to the operating mode that was active before entering the printer emulation control mode 72. This solves the problem of being unable to change to a different operating mode due to a functional limitation of the command system W used in the printer emulation control mode 72.

This function is described below.

Figure 7:
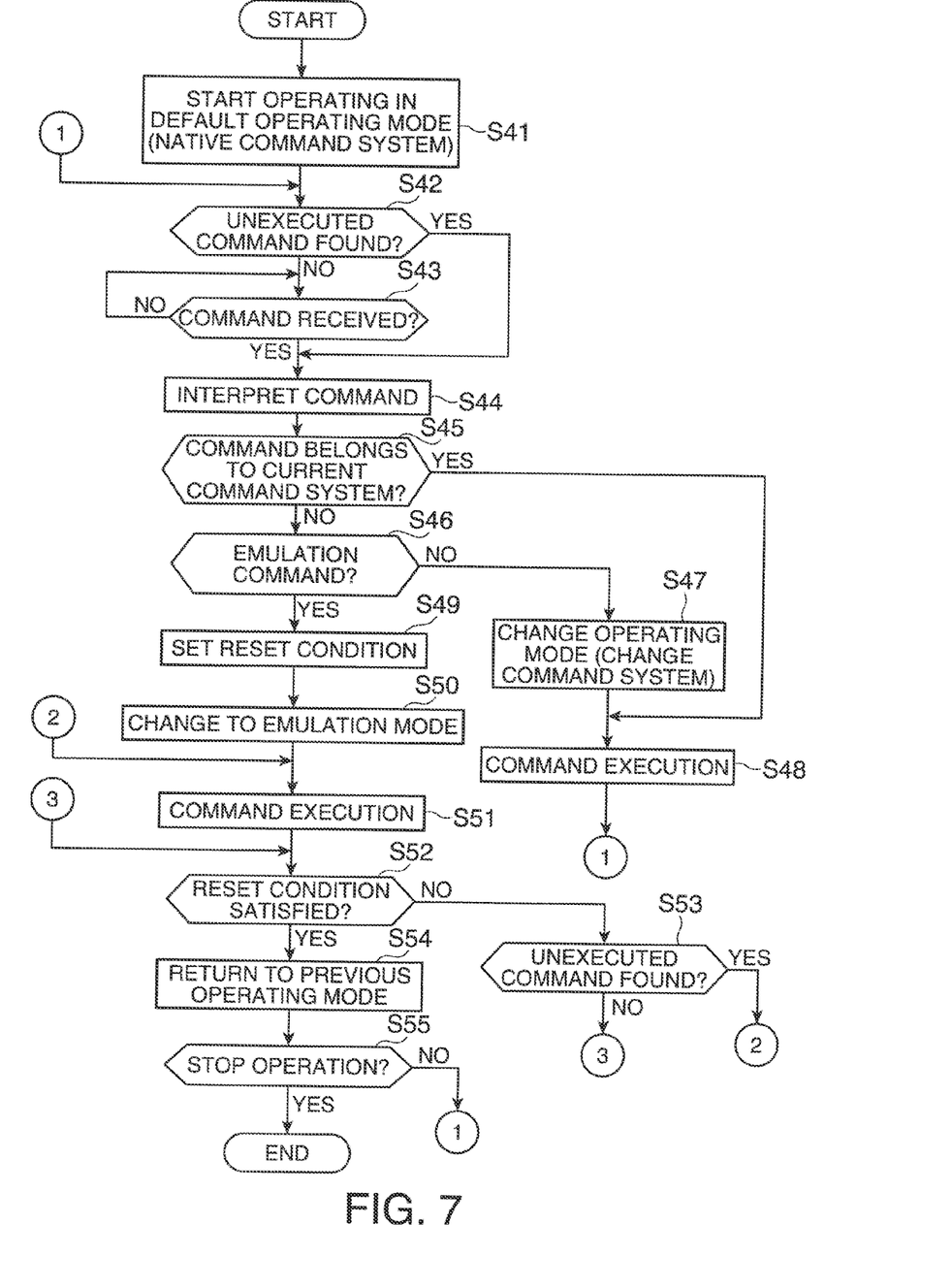
FIG. 7 is a flow chart describing switching the operating mode of the hybrid device.

FIG. 7 is a flow chart showing the operation when changing the operating mode of the hybrid device 10.

FIG. 7 shows the operation of the control unit 70 related to changing the operating mode. The control unit 70 functions as a command control unit and a transition condition setting unit when executing the operation shown in FIG. 7.

When the hybrid device 10 power turns on, the control unit 70 starts operating in the default operating mode preset in the storage unit (first command system, default (native) command system of the electronic device, command system of a first process unit) (step S41). The default operating mode is compatible with a multifunction command system including a command for instructing a change to another operating mode. In this embodiment of the invention, the default (native) operating mode is set to the printer control mode 71.

The control unit 70 determines if there is a command in the receive buffer 66 that has been received but still not executed (step S42), waits until a command is received if an unexecuted command is not in the receive buffer 66 (step S43), and interprets the received command when a command is received from the host computer 200 (step S44). If there is a command that has not been executed (step S42 returns Yes), the control unit 70 interprets the commands in the receive buffer 66 in the order received (step S44).

The control unit 70 interprets the command in step S44, and determines if it is a command contained in the current command system, that is, in the command system V of the printer control mode 71, or is a command belonging to another command system (step S45). If the command is not a command for the current command system (step S45 returns No), the control unit 70 determines if the interpreted command is contained in the command system of a device emulation operating mode (step S46). If the command system containing the interpreted command is a command system for an operating mode other than an emulated command system (step S46 returns No), the control unit 70 switches to the operating mode controlled by the command system corresponding to that other operating mode (step S47), and executes the command (step S48).

When executing the command is completed, the control unit 70 returns to step S42. If the interpreted command is a command in the current command system (step S45 returns Yes), the control unit 70 goes to step S48 and executes the command.

When the control unit 70 interprets the command in step S44 and detects a switching command, the command is contained in the command system of the printer control mode 71 but the control unit 70 returns No in step S45 as an exception. The control unit 70 then determines if the command system that is identified by the switching command when the command system to be selected is contained (identified) in the switching command, or if the command system that is set in the storage unit when the command system to be selected is not contained in the switching command, is the command system of an operating mode to be emulated (step S46), and continues processing according to the specified command system. The command system that is switched to can be preset in the storage unit by the control unit 70 receiving a configuration command and storing the command system specified by the configuration command as the command system to be selected.

If the interpreted command is a command belonging to a command emulation system (step S46 returns Yes), the control unit 70 sets the reset conditions contained in the command. Alternatively, if the interpreted command is a command of an emulated command system (step S46 returns Yes), the control unit 70 sets the reset conditions contained in the command. Alternatively, if the received command is a switching command and reset conditions (state transition conditions) are contained in that switching command, those reset conditions are set; if reset conditions are not contained, the reset conditions stored in the storage unit are read and set. A command for setting the reset conditions could also be received, and the control unit 70 could set the reset conditions specified in the configuration command in the storage unit.

Examples of these reset conditions include, for example, passage of a specified time after switching the operating mode (command system) to an emulation mode; finishing executing all commands in the emulated command system received from the host computer 200; finishing executing all commands stored in the receive buffer 66; finishing executing a single interpreted command; executing a specific command; and the receive buffer 66 becoming empty. Examples of a specific command include a line feed command, a form feed command, a page feed command, a paper discharge command, or other command denoting a break in operation when the hybrid device 10 is in the printer emulation control mode 72 operating as a printer, and there is preferably no adverse effect on print quality if the hybrid device 10 pauses operation after executing the specific command.

After the reset conditions are set or read, the control unit 70 switches to the emulation operating mode (second command system, command system for emulating the command system of another electronic device, command system of a second process unit) (in this example, the printer emulation control mode 72) (step S50), and executes the interpreted command or the command of the command system for the emulation operating mode received from the host computer 200 (step S51).

After executing the interpreted command, the control unit 70 determines while in the emulation operating mode whether or not the reset condition is satisfied (step S52), and if the reset condition is not satisfied (step S52 returns No), determines if there is a command that has not been executed in the receive buffer 66 (step S53). If there is an unexecuted command, the control unit 70 goes to step S51 and executes the command. If there is not an unexecuted command, the control unit 70 returns to step S52 and determines if the reset condition is satisfied.

If the reset condition is satisfied (step S52 returns Yes), the control unit 70 resumes the operating mode in use before entering the emulated operating mode (that is, the original operating mode, the printer control mode 71 in this example) (step S54). When hybrid device 10 operation stops (step S55 returns Yes), this process ends. If hybrid device 10 operation does not end, control returns to step S42. The reset condition of the command system can be constructed as a reset symbol and argument contained in the switching command. For example, the switching command could be "ESC C:W R:V S:1" where ESC denotes a command in command system V, and C:W R:V S:1 are arguments where C (change) denotes changing to command system W, R (return) denotes returning to command system V; and S (stipulation) denotes the reset condition. In this example, control switches from command system V to command system W, a specific operation is performed according to the command received from the host computer 200 in command system W, and when the reset condition is satisfied, control returns to command system V. In addition, 1 is an argument indicating completion of one command, other numerals denote other arguments, and other reset conditions and combinations of arguments are also possible. When this switching command is received, the control unit 70 changes the command system, stores the reset condition in RAM 41 or flash memory 42, monitors the processing state and the defined reset conditions, and changes to the specified command system when the reset condition is satisfied.

As described above, a hybrid device 10 according to a preferred embodiment of the invention has a control unit 70 that switches between a plurality of command systems (operating modes) according to switching commands sent from a host computer 200, and after changing the command system sets specific reset conditions (transition conditions) for switching to yet another command system. When the set reset condition is satisfied, the control unit 70 reverts to the previous operating mode or changes to another operating mode. As a result, the hybrid device 10 can switch to a different operating mode even if it is using an operating mode (such as the printer emulation control mode 72) that does not have a command defined for switching to a different operating mode. A function for changing to another operating mode can therefore be sustained regardless of the specifications of the operating mode being used.

The reset condition is contained in the switching command sent from the host computer 200, and the control unit 70 sets the reset command contained in the switching command received from the host computer 200. It is therefore possible to change the command system of the hybrid device 10 and to set the transition conditions used after the command system is changed by a single switching command sent from the host computer 200. The hybrid device 10 can therefore be easily configured to automatically return to the original command system after changing to a specific command system and completing a specified operation without receiving another switching command from the host computer 200.

Based on commands sent from the host computer 200, the control unit 70 can also switch between a plurality of operating modes including a printer control mode 71 that is the normal (default) operating mode, a scanner control mode 75, a MICR control mode 76, a MSR control mode 77, and a printer emulation control mode 72, which is an emulated operating mode corresponding to a command emulation system for emulating an operating mode of another device. The printer emulation control mode 72 is a non-switching operating mode that does not have a command for changing to another operating mode.

More specifically, the control unit 70 is compatible with and can switch between a plurality of command systems including command system V, which is the command system of the normal operating mode, and command system W, which is a command system for emulating another device. When the set reset condition is satisfied after switching from command system V (printer control mode 71) to command system W (printer control mode 72), the control unit 70 changes from the printer emulation control mode 72 corresponding to command system W back to the printer control mode 71 corresponding to command system V.

It is therefore possible to change to a command system W that emulates another device (printer W in this example) and then return to command system V, which was the command system before the command system was changed, when the reset condition is satisfied even if a switching command for changing to another command system is not defined in the command system W for emulating the other device. It is therefore possible to switch to an advanced command system with great functionality after using a command system with limited functionality even when a command system with limited functionality must be used in order to emulate the operation of older devices with limited functionality, for example. Different types of devices can therefore be properly emulated while assuring user convenience.

The operating modes that the control unit 70 can switch between include a printer control mode 71 using command system V, which is a switching command system compatible with a switching command, and a printer emulation control mode 72 compatible with command system W, which is a non-switching command system that is not compatible with a switching command, and a condition enabling the control unit 70 to switch from the printer emulation control mode 72 to the printer control mode 71 is set as the reset condition. As a result, when changing from a switching command system compatible with a switching command used by the hybrid device 10 to a non-switching command system that does not have a command to instruct changing to another command system, the hybrid device 10 can set transition conditions and switch to the other command system when the transition conditions are satisfied even though a device according to the related art cannot change from a non-switching command system to another command system. A function for changing to another command system can therefore be rendered regardless of the specifications of the command system used.

The hybrid device 10 also sets as a reset condition at least one of the following: passage of a specified time after switching the command system; finishing executing all commands received from the host computer 200; and finishing executing a single command received from the host computer 200. As a result, a function for changing to another command system can be reliably maintained regardless of the specifications of the command system. Other reset conditions, that is, opportunities for changing to a different command system, include the receive buffer that stores received commands becoming empty, and when the print unit of the hybrid device 10 executes a line feed or page feed operation.

The hybrid device 10 also has a recording head 18, carriage 19, carriage drive motor 56, media conveyance motor 26, and motor driver 46 as a print unit that prints on the processed medium according to commands sent from the host computer 200, and an optical reader 110 that optically reads the processed medium according to commands sent from the host computer 200. The control unit 70 determines if commands sent from the host computer 200 are commands for the print unit or commands for the optical reader 110, switches to a printer control mode 71, 72, if the command is for the print unit, and switches to the scanner control mode 75, which is the operating mode for controlling the optical reader 110, if the command is for the optical reader 110. As a result, a hybrid device 10 that has a print unit and an optical reader can switch between and execute different operating modes according to the selected function because the commands that are used are changed according to the device addressed by the commands sent from the host computer 200.

A preferred embodiment of the invention is described above, but the invention is not limited thereto. For example, the control unit 70 returns (step S54) to the previous operating mode in this embodiment of the invention when the reset condition is satisfied in the operation shown in FIG. 7, but the invention is not so limited and the control unit 70 could go to a different operating mode. For example, when the printer control mode 71 is set as the default operating mode as described above, control could always return to the printer control mode 71 regardless of which operating mode is used when the specified reset condition is satisfied.

In addition, an emulation operating mode and an operating mode that is switched to from the emulation mode could be separately defined so that control goes to the scanner control mode 75 when the reset condition is satisfied while in the printer emulation control mode 72. This setting could be configured with the reset condition. The reset condition could also be defined on the fly. Further alternatively in a configuration that always uses a single reset condition previously stored in flash memory 42, the reset condition can be selected in step S49 from among a plurality of reset conditions stored in flash memory 42 according to the type of operating mode emulated, the type of operating mode used before the change, or the type of recording medium S being processed, for example.

The control unit 70 could also monitor whether or not the reset condition is satisfied either at a specific time interval or constantly during operation in the emulation mode. In this configuration, the operating mode could be changed when the reset condition is met, or when executing the command is completed.

The control unit mounted on the control circuit board (not shown in the figure) installed in the hybrid device 10 is described in the foregoing embodiment as having the functions of the function blocks shown in FIG. 4 and FIG. 5, and controlling other units of the hybrid device 10, but a device externally connected to the hybrid device 10 could function as part or all of the function units shown in FIG. 4 and control the hybrid device 10. In addition, the function blocks shown in FIG. 4 and FIG. 5 are achieved by cooperation between hardware and software, but the specifics of the hardware and software configurations can be determined as desired, and other detailed aspects of the configuration can be changed as desired.

The foregoing embodiment describes a hybrid device 10 having a SIDM recording head 18, magnetic head 34, and optical reader 110, but the invention is not so limited and can obviously be adapted to other configurations having an optical reading unit equivalent to the optical reader 110 disposed to an inkjet printer, thermal printer, or laser printer, for example. The invention is also not limited to stand-alone devices, and the invention can obviously be adapted to devices that are incorporated into another device such as an ATM (automated teller machine) or cash dispenser.

A program that implements the steps of switching the operating mode of the hybrid device 10 shown in FIG. 7 and is stored in a storage unit or storage medium in the hybrid device 10, or a storage medium external to the hybrid device 10, can also be read and executed by the control unit 70.

Although the present invention has been described in connection with the preferred embodiments thereof with reference to the accompanying drawings, various changes and modifications will be apparent to those skilled in the art in light of this disclosure. Any and all such changes or modifications are considered to be within the scope of the present invention to the extent encompassed by any of the following claims.

What is claimed is:

1. An electronic device configured to communicate with a host computer, the electronic device comprising:
    a storage that stores at least a first command system and a second command system, the first command system including a first group of commands to operate a first control mode and the second command system including a second group of commands to operate a second control mode;
    a receive buffer configured to receive from said host computer at least one mode-switching-condition selection that specifies at least one switch-triggering condition, said switch-triggering condition being an operation condition achievable by said electronic device in said second control mode;
    a transition condition configuration element that, in response to an instruction to switch to said second command system, configures the monitoring of operation of said electronic device for said switch-triggering condition; and
    a command controller that, in response to said instruction to switch to said second command system, switches the operation of said electronic device to said second command system and then automatically switches back from the second command system to the first command system when the switch-triggering condition is satisfied.

2. The electronic device described in claim 1, wherein:
    the instruction to switch to said second command system is part of a control-mode switching command available in said first command system; and
    the second command system lacks any control-mode switching command.

3. The electronic device described in claim 2, wherein the mode-switching-condition is contained in the control-mode switching command.

4. The electronic device described in claim 2, wherein the storage stores a third command system including a third group of commands to operate a third control mode, and a switching condition for changing operation by the controller from the third command system to the second command system or vice versa is defined within the control-mode switching command.

5. The electronic device described in claim 1, wherein the first control mode is a native control mode of the electronic device, and the second control mode is an emulation control mode that emulates a native control mode of a foreign electronic device different from said electronic device.

6. The electronic device described in claim 1, wherein:
    the first group of commands is defined by a first command language, and the second group of commands is defined by a second command language different from the first command language;
    the command controller determines if a command received from the host computer is from said first command language or from said second command language;
    recognizes said instruction to switch to said second command system if a command from said second command language is received while in said first command system; and
    recognizes an instruction to switch to said first command system if a command from the first command language is received while in said second command system.

7. The electronic device described in claim 6, further comprising:
    a print head assembly that prints on a processed medium; and
    an optical reader that optically reads the processed medium;
    wherein the first command system is either a command system for controlling the print head assembly or a command system for controlling the optical reader, and
    wherein the second command system is the other of the command system for controlling the print head assembly and the command system for controlling the optical reader.

8. The electronic device described in claim 1, wherein said at least one mode-switching-condition selection is freely selected from among a plurality of predefined operation conditions.

9. The electronic device described in claim 8, wherein plurality of available switching conditions includes the passage of a specific time period in the second command system, the completing of execution of all commands currently received from the host computer, the completing of execution of a specific command received from the host computer, and the reception of a pre-defined command within the second group of commands that is not a control-mode switching command.

10. The electronic device described in claim 1, wherein said electronic device is a single printer.

11. A control method for an electronic device configured to communicate with a host computer, and store at a plurality of command systems, the method comprising steps of:
    responding to reception of a specific command from the host computer that is interpreted to include an instruction for switching from a current command system to a target command system by changing operation of the electric device to said target command system;
    if the specific command specifies a transition condition for switching out of the target command system, then setting the monitoring of the electronic device for the transition condition specified in the specific command; and
    responding to the transition condition being monitored becoming satisfied by automatically changing operation of the electronic device from the target command system to another command system;
    wherein each of said command systems includes a respective, unique command language.

12. The electronic device control method described in claim 11, wherein:

the command language of the current command system includes a switching command for switching out of a command system; and the command language of the target command system lacks any switching command from switching out of a command system.

13. The electronic device control method described in claim 11, wherein the another command system is specified in said specific command, and the another command system is different from said current command system.

14. The electronic device control method described in claim 11, wherein:

the electronic device further stores a default transition condition;

the specific command includes a data field for specifying a desired transition condition for switching out of the target command system; and if the specific command does not specify any transition condition for switching out of the target command system, then setting monitoring of the electronic he default transition condition.

15. The electronic device control method described in claim 11, wherein the current command system is a native command system of the electronic device, and the target command system is an emulation command system that emulates a native command system of foreign electronic device.

16. The electronic device control method described in claim 11, wherein:

the electronic device determines the command language to which a command received from the host computer belongs; and interprets said specific command to include said instruction for switching from said current command system to said target command system if said specific command is a command from the command language of the target command system and said specific command is received while said electronic device is in said current command system.

17. The electronic device control method described in claim 16, wherein the electronic device also includes a print head assembly that prints on a processed medium, an optical reader that optically reads the processed medium; the current command system is either a command system for controlling the print head assembly or a command system for controlling the optical reader, and the target command system is the other of the command system for controlling the print head assembly and the command system for controlling the optical reader.

18. The electronic device control method described in claim 11, wherein the transition condition is at least one of: the passage of a specific time after changing to the target command system, finishing executing all commands currently received from the host computer, finishing executing one command received from the host computer, and reception of a pre-defined command within the second group of commands that is not a control-mode switching command.

19. A non-transitory storage medium that stores a program for execution by a controller to execute the control method of claim 11.

20. The electronic device described in claim 15, wherein the electronic device is native printer, the native command system defines native printer functions of the native printer, and the emulation command system emulates a second printer using printer functions foreign to the native printer.

* * * * *